US007853867B2

(12) United States Patent
Egilsson

(10) Patent No.: US 7,853,867 B2
(45) Date of Patent: *Dec. 14, 2010

(54) MODULAR APPLICATION DEVELOPMENT IN A SPREADSHEET USING INDICATION VALUES

(76) Inventor: Ágúst Sverrir Egilsson, Vallarbraut 15, 170 Seltjarnarnes (IS)

(*) Notice: Subject to any disclaimer, the term of this patent is extended or adjusted under 35 U.S.C. 154(b) by 342 days.

This patent is subject to a terminal disclaimer.

(21) Appl. No.: 10/857,929

(22) Filed: Jun. 2, 2004

(65) Prior Publication Data

US 2004/0225957 A1 Nov. 11, 2004

Related U.S. Application Data

(60) Continuation of application No. 09/781,294, filed on Feb. 13, 2001, now Pat. No. 6,763,498, which is a division of application No. 08/690,919, filed on Aug. 1, 1996, now Pat. No. 6,286,017, which is a continuation-in-part of application No. PCT/DK96/00080, filed on Feb. 22, 1996, and a continuation-in-part of application No. 08/392,164, filed on Feb. 22, 1995, now abandoned.

(51) Int. Cl.
*G06F 17/00* (2006.01)
(52) U.S. Cl. .................. 715/212; 715/217; 715/219; 715/220
(58) Field of Classification Search .................. 715/503, 715/504, 212–220
See application file for complete search history.

(56) References Cited

U.S. PATENT DOCUMENTS

| | | | |
|---|---|---|---|
| 4,901,221 A | 2/1990 | Kodosky et al. |
| 4,914,568 A | 4/1990 | Kodosky et al. |
| 4,956,773 A | 9/1990 | Saito et al. |
| 5,021,973 A | 6/1991 | Hernandez et al. |
| 5,033,009 A | 7/1991 | Dubnoff |
| 5,093,907 A | 3/1992 | Hwong et al. |

(Continued)

OTHER PUBLICATIONS

"The MathWorks announces Excel Link; Customers can integrate MATLAB's advanced mathematics and visualization capabilities with Microsoft Excel; Creates a comprehensive, accessible financial computing environment", Business Wire, May 13, 1996, http://findarticles.com/p/articles/mi_mOEIN/is_1996_may_13/ai_18276702/, pp. 1-3.*

*Primary Examiner*—Chau Nguyen
(74) *Attorney, Agent, or Firm*—Harness, Dickey & Pierce, P.L.C.

(57) ABSTRACT

A graphical application developing and managing environment is described capable of representing and editing program modules using multiple display formats, which include embedding source code written in a functional language into a spreadsheet-like format. Methods are described for enabling the sharing of program modules by defining standardized interfaces into program modules and existing documents and by centrally locating module definitions. A patchwork mechanism is described requiring only basic spreadsheet editing skills on behalf of the user, enabling a user of the environment to connect external documents and program modules into a new program application. The invention allows complicated programming and simple end-user programming to be achieved within a unified environment and allows the execution of program modules and tracing of variables simultaneously with the writing of a program application. The invention defines methods for representing the various parts of a source code, defining a program application, along with the application icon as determined by a user creating the application and thereby making parts of the source code accessible to end-users for run-time execution.

8 Claims, 16 Drawing Sheets

U.S. PATENT DOCUMENTS

| | | | |
|---|---|---|---|
| 5,182,793 A * | 1/1993 | Alexander et al. | 706/13 |
| 5,255,363 A * | 10/1993 | Seyler | 715/526 |
| 5,317,686 A * | 5/1994 | Salas et al. | 715/212 |
| 5,319,777 A * | 6/1994 | Perez | 707/10 |
| 5,361,393 A * | 11/1994 | Rossillo | 713/1 |
| 5,428,712 A | 6/1995 | Elad et al. | |
| 5,437,006 A * | 7/1995 | Turski | 715/209 |
| 5,481,715 A * | 1/1996 | Hamilton et al. | 719/316 |
| 5,551,041 A * | 8/1996 | Beethe | 710/260 |
| 5,623,592 A * | 4/1997 | Carlson et al. | 345/866 |
| 5,625,823 A * | 4/1997 | Debenedictis et al. | 717/139 |
| 5,680,557 A | 10/1997 | Karamchetty | |
| 5,768,158 A * | 6/1998 | Adler et al. | 715/503 |
| 5,799,295 A * | 8/1998 | Nagai | 706/46 |
| 6,113,649 A * | 9/2000 | Govindaraj | 717/113 |
| 6,154,875 A * | 11/2000 | Tanaka et al. | 717/107 |
| 6,182,160 B1 * | 1/2001 | Burgess | 710/3 |
| 6,334,211 B1 * | 12/2001 | Kojima et al. | 717/128 |

* cited by examiner

MODULAR APPLICATION DEVELOPMENT IN A SPREADSHEET USING INDICATION VALUES

This application is a continuation of application Ser. No. 09/781,294, filed on Feb. 13, 2001 now U.S. Pat. No. 6,763,498, which is a divisional of application Ser. No. 08/690,919, filed on Aug. 1, 1996 now U.S. Pat. No. 6,286,017, which is a continuation-in-part of International PCT Application No. PCT/DK9600080, filed Feb. 22, 1996 and application Ser. No. 08/392,164 filed Feb. 22, 1995 now abandoned, the entire contents of each of which are hereby incorporated by reference and for which priority is claimed under 35 U.S.C. §120.

TECHNICAL FIELD

In general the present invention relates to an application building environment. More specifically, the present invention relates to an application building and managing environment in which users of computer systems, including ones with minimal programming knowledge, create and share powerful software applications.

BACKGROUND OF THE INVENTION

In a conventional application building environment such as in most third and fourth-generation programming languages, the task of constructing an application requires intensive knowledge of specialized methods and structures. Existing application environments do not enable end-users with limited programming knowledge to combine program modules from other users and program developers into complicated applications. The sharing of program components is done on a level inaccessible by the end-user. Furthermore, existing systems do not combine programming at different skill and complication levels into a unified environment where complex programming and simple end-user programming follow the same approach. The components of an application are usually rigorously embedded into the program source code either in the form of text or as a combination of text and objects. This results in difficulties in sharing computer components. Module and data dictionaries and well organized program libraries provide a partial solution to this problem. However there are still very limited possibilities for end-users of computer systems to share or even build complicated applications involving rich modular programming structure without intensive knowledge of a complicated programming environment.

The introduction of multidimensional spreadsheets allows users of such systems to create more complicated calculation models through a smooth transaction from two-dimensional spreadsheets and is thus a step toward making applications manageable by the end-user. Current spreadsheet systems however do not focus the user's attention on the underlying logical modular structure ever-present in an application. Furthermore current spreadsheet systems do not generalize the spreadsheet concept in such a way that powerful programming techniques can be applied without leaving the methodology of the spreadsheet environment but instead employ add-on techniques such as the writing of macros to enhance usability.

There exist numerous source code generators and fourth generation programming environments using graphical structures as part of application generation. Source code generators however and most other application building environments, by definition, are intended for program development and provide an environment for developing applications which is entirely different from the end-user environment. Thus the end user is separated from the application building environment and is unable to create or share application components without moving up to the application developing level.

U.S. Pat. No. 4,956,773, issued Sep. 11, 1990 to Saito et al., describes methods for creating programs using various diagrams. The Saito patent is directed to an apparatus for automatically creating a source program, in particular the coding of the source program is automatically performed from program specifications which the programmer generates, in order to reduce the burden required to create such a source program. As illustrated in FIG. 11 of Saito the source code is automatically generated from a module structure diagram.

U.S. Pat. No. 5,255,363, issued Oct. 19, 1993 to Seyler, describes methods for writing programs within a spreadsheet application. The Seyler patent is directed to a graphical programming system with a spreadsheet base for enabling users to create graphical programs for displaying and manipulating data. The Seyler invention allows a user to create graphical programs which can monitor parameters (such as cost and reliability) and provide feedback during the design of electronic systems, such as circuit boards.

U.S. Pat. No. 5,317,686, issued May 31, 1994 to Salas et al., describes relabeling of spreadsheet cells. The Salas et al patent is directed to an apparatus and labeling scheme which permits a user to reformat, redefine, and relabel the various cells of a multidimensional spreadsheet. The Salas et al patent also permits the creation of multidimensional spreadsheets where calculations are specified through general, rather than per cell, formulae.

SUMMARY OF THE INVENTION

An object of the present invention is to provide a graphical application developing and managing environment in which the building and sharing of application components is done largely by the end-user.

The above object is accomplished by combining a graphical logical modular structure diagram, methods for embedding source code for a class of programming languages into a visual spreadsheet-like format, and standardized interfaces into modules and external applications.

Central to the present invention is the definition of an indication value system which allows spreadsheet methodology to be applied to an advanced functional language. The indication value system is an extremely practical invention since it empowers the spreadsheet user to create general software applications without having to abandon the spreadsheet methodology. It thus addresses the well known challenge of end-user empowerment in the creation of software components.

Modular structure is present in any software application and can be visualized in many different ways depending on which program parts are grouped together to form a module and how they are interconnected. However the term logical modular structure used above represents a modular structure describing a solution to a specific task an application is intended to perform.

According to the present invention, application or module building can be done by drawing on a display unit a logical modular structure diagram describing how the new module is connected to other modules representing existing applications, previously written modules and unfinished modules. Using this diagram detailed description about the application is attached to the various parts of the diagram so as to represent the flow of information between the modules and the manipulation and visual representation of information. The new module is assigned an interface part. The interface part is a standardized interface, through which future applications communicate, and which can be used as an interface to external applications such as databases. The present invention thus enables the creation of standardized interfaces, visually represented, into modules including modules which overlay external applications.

The present invention provides methods for using as an equivalent alternative to the text format a spreadsheet-like format when writing and executing source code written in a functional programming language, methods for moving back and forth from the spreadsheet format and the traditional text format and methods for attaching source code to the parts of the above logical modular structure diagram.

There exist many different ways to define statements in a functional language, or any language for that matter, other than using traditional text definitions. The methods described herein also apply in cases when alternatives to the text format are used. This can be verified by noticing that one can translate alternative representations of code into the traditional text format. The patchwork mechanism, which will be described in details below, can be considered to be a graphical representation/definition of statements defining calls to child modules and is thus an example of an alternative to the text format for such statements. The patchwork mechanism employs the cell format, described herein also, to define parent-child module relationships in an end-user friendly way.

The term functional programming language or a functional language refers to a programming language in which each statement written in the language can be evaluated, based on its dependent variables, to a uniquely defined value of some type. This does not automatically exclude languages in which order of execution is important, since we do not require the languages to be "pure functional languages", see for example in the literature: Sethi, Ravi. Programming Languages, Addison-Wesley Publishing Company, 1990. The term advanced functional language applies to a functional language which can be used to handle and return more complex variables than the basic variable types text and number. An example of a very simple source code (module Audio) written according to the above principle is shown in connection with the description of FIG. 8.

In one aspect, the invention relates to a method for visually representing in a computer system a program specification, i.e., source code, written in an advanced functional language in a spreadsheet-like cell format and for allowing the execution of the program specification within the cell format. The method comprises:

communicating with a display device connected to a process device, accessing a cell frame containing multiple cells displayed on said display device, displaying text and icons in said cell frame, associating selected variables and corresponding definitions in said program specification with cells in said cell format, determining values of said selected variables by executing said program specification, and displaying in cells, associated with said selected variables, an indication value determined by an indication function representing values of said selected variables.

The invention also relates to a system which is suitable for performing the method. The system comprises (a) Means for communicating with a display device connected to a process device. In a normal setting, this may be a program which through the operating system of the computer displays cell-frames, text and figures on a display device.

(b) Means for accessing a cell frame containing multiple cells displayed on said display device. This may be provided, via a computer program, by naming the cells and by tracking information about the cells such as location and content.

(c) Means for displaying text and icons in said cell frame. This may be a program capable of changing the content of a cell on request.

(d) Means for associating selected variables and their definitions in said program specification to cells in said cell format. This may be a program connecting variable names from the source code to cell names in the cell frame.

(e) Means for determining values of said selected variables by executing said program specification. This may be a compiler and a parser or an interpreter of the programming language used.

(f) Means for displaying in cells, associated to said selected variables, an indication value determined by an indication function representing values of said selected variables. This may be a program implementing an indication, function capable of displaying in a cell, an indication value of a variable, defined in the source code by a statement written in an advanced functional language and associated with the cell, representing objects of a more general nature than formatted text or numbers. Such objects are, for example, tables from a database, databases, rows from tables, sound and video specifications, geometrical figures, program parts such as forms, mathematical formulas and many other objects.

Normal spreadsheet systems do not extend to allow the general representation of code written/created in an advanced functional language as discussed in the present description.

In important embodiments, the system includes means for displaying the full value of a variable associated to a cell in the cell format. This may be a program communicating to the user additional information about the object referred to by the value associated with the cell and possibly submitting the value to another system capable of providing insight into the value when such a system is available. Displaying the full value thus attempts to display a value in a system native to the value. An example of a full value would be to open up a table frame to display the content of a table referred to in a cell. This is done, depending on the embodiment, by submitting the table value to a system capable of displaying and possibly allowing the editing of the content of the table in a table frame or including a procedure capable of displaying the content of the table in the embodiment itself. Another example is submitting a sound variable, referred to in a cell, to a sound system thus allowing the user to play or edit the sound within the system.

In any practical embodiment, the system should include means for editing the statement defining the variable associated to a cell in the cell format. These means may, e.g., be provided by a program implementing a text editor displaying the definition of a statement associated to a cell, upon request, and allowing the user to edit the statement definition similar to the editing of functions and formulas in most spreadsheet applications. This occurs at a lower level connecting an input device and a process device in a way which enables the editing.

In some cases it may be convenient for the user to be able to view some part of the program specifications in a pure text format and the invention provides means for doing that and for going between the two formats, i.e., the cell and the standard text format. This feature may be provided by using the standard text format and by implementing a translation algorithm, see, e.g., FIG. 10 and FIG. 11, to move back and forth between the display formats.

In an embodiment of the invention, the cell format is used together with additional means to structure and visualize the writing and editing of a program application further. A system suitable for this embodiment would further include means comprising:

(a) Means for communicating with an input device connected to the process device for allowing the editing of text and figures.

(h) Means, provided, e.g., by a program capable of drawing parent-child relational diagrams, for displaying a modular structure diagram on the display device representing the call declarations part of the program specification.

(i) Means for organizing the remaining program specification, excluding the call declarations, of said program specification into predetermined smaller parts each containing a selection of variables and their definitions. This may be a program, usually part of the parsing mechanism and possibly accepting user input, to classify the statements in said program specification.

(j) Means for displaying at least some of said parts and, if desired, each of said parts, on the display device. This feature may be provided by displaying the statements in each part either in text or cell format.

(k) Means for editing or creating the program specification by editing at least some of said parts and/or by editing said modular structure diagram. The editing of the statements in text or cell format may be done by a text editor as described above. Editing said modular structure diagram is usually done with a graphical editor capable of representing parent-child modular relationships, and the resulting modular structure is translated to conform to the programming language used.

In most programming languages, code can be divided into several parts which are expressed differently in different languages, but serve the same purpose. Such a division is obtained by classifying program specifications into input declarations, output declarations, call declarations, call definitions and program statements. For this division it is assumed that said input declarations, when assigned values, define values of said output declarations using said output declarations, said call declarations, said call definitions and said program statements. It is also assumed that said call definitions define a flow of information through the modular structure existing in the program and that the modular structure is described by said call declarations. An embodiment of the invention uses this classification and represents each of the parts, not necessarily independently, in various formats for viewing, execution, tracing and editing.

Logically this classification is related to the modular structure diagram and, in an embodiment, an association is created between areas of the diagram, for example knots representing modules and lines representing the flow between modules, by assigning at least some of the program parts, or if desired each of the program parts, excluding call declarations, to specific areas or objects of the diagram. The user can then access a specific part of the program specifications by using an input/pointing device to designate an object or area of the modular structure diagram. These additional means may be implemented using well-known program routines.

In another aspect, the invention relates to an application building and sharing environment, comprising:

(a) A collection of, possibly user defined, program modules stored on storage devices.

(b) Display means capable of defining a work area on a display device.

(c) Module organizing means for organizing a program module from said collection into predefined parts including an interface part, call declaration part and call definition part. These means may be provided by a program, usually part of the parsing mechanism and possibly accepting and storing user input at some point, to classify the statements in said program module.

(d) Icon representation means capable of assigning icons to at least some of the program modules, or if desired each of the program modules, from said collection and capable of displaying said icons on the work area. This feature, may be provided by associating each module to a geometrical figure or a bitmap and possibly also text and displaying the resulting figure and text on said work area.

(e) Interface representation means capable of displaying, on the work area, said interface part of a program module from said collection in a cell format, using indication values.

(f) Data flow representation means capable of displaying, on said work area using a cell format, the call definition part of a parent-child module relationship within a program module from said collection. Examples are explained in connection with FIG. 7.

(g) Structure means capable of displaying on the work area a modular structure diagram for a program module from the collection graphically, representing the parent-child module relationships declaration part within the program module, see, e.g., FIG. 4.

(h) Sharing means to allow a user to select program modules from said collection and represent a selected program module by its icon on said work area. This feature may, in one embodiment, be provided by a shared folder-like system allowing the user to select the program module and locate it on the work area using an input/pointing device.

(i) Program module editing means capable of allowing the user to edit and add program modules to said collection by editing each of said predefined parts of a program module from said collection.

(j) Program module execution means capable of determining and displaying, using the interface cell format of a program module from said collection, indication values representing results of executing said program module definitions. This feature may be provided by an algorithm implementing an indication function after the execution (implies parsing and compiling or interpreting) of the code has assigned values to the relevant variables.

One embodiment of the environment is implemented as follows. The above program module editing means allow a user of the application environment to edit graphically said modular structure diagram to create and delete parent-child relationships within the module. The data flow definitions are edited within the data flow cell format, explained in connection with FIG. 7, and wherein said interface part is edited within the interface cell format, see FIG. 5 and FIG. 6. The graphical editing of the modular structure (call declarations) and the editing of the flow between modules using the data flow cell format defines a patchwork mechanism in the environment. Thus, it becomes possible for the user to define program and flow variables and view their values simultaneously using a patchwork mechanism.

For a user not allowed to change the definition of a particular module in the collection, this will be sufficient to allow the user to view results obtained by executing the module. In order to be able to define the module, using the cell format, the environment must not exclude the remaining statements (the program part) from being edited in the cell format.

In an application environment, in which users have access to shared programming modules, there should be some way to control the access of the individuals to the modules. In an embodiment, this may be provided by associating with each module, information about the privileges required to use the module and comparing it to privileges of users trying to access the module.

In a preferred embodiment of the environment it is important to be able to adjust to at least some other existing programming environments. This may be achieved by implementing a compiler, for the programming language used, returning object code compatible to other systems, also referred to here as exporting a module to another system.

The above application building and sharing environment may further include means for associating and displaying with the module icon, of a program module from above collection, icons representing user selected variables within the program module specification. This feature may be provided by associating a control icon, usually a button, with a specific variable in the program specification. Then means for allowing a user to access the full value of the variable, associated to the control icon, may be provided by executing, upon request, the program parts needed to define the variable and when the variable value has been determined the full value is displayed. Since, for non-constants, the value of a variable in a module is only defined when the input variables are defined, this assumes that the system has available input values for the module. A suitable way is to store, for each user, the input values used in the last execution of the module or a set of default input values. In a spreadsheet system this is always the case, i.e., values are not removed from the cells after execution of the program.

In yet another aspect, the invention relates to a method of representing with an application (e.g. module) icon, at least some of the executable parts from within an application. A system useful for performing this method comprises:

(a) A program module, defining an application, specified using an advanced functional language.

(b) An icon representing said application.

(c) Means for displaying icons on a display device.

(d) Means for allowing a user to select variables from within said program module and represent at least some of the selected variable independently with a respective icon (such as icon 402 shown on FIG. 4). This feature is provided by enabling the user to choose from the source code which variables should be represented individually.

(e) Means for allowing the user to define the display positions of the variable icons relative to the application icon. This may be done by storing and using the relative position, selected by the user, of the variable icon.

(f) Means for displaying the application icon and the variable icons on a display device in the configuration determined by the user. This feature is usually provided by a figure and bitmap display mechanism and by retrieving the relative position of each of the variable icons from storage.

(g) Means for communicating with an input/pointing device and displaying the full value of at least some of the variables selected when the associated variable icon is designated by said input device. This feature is provided in a manner similar to the feature discussed above and requires the system to have available input values for the module.

This generates a setting in which a user of the application can execute, at run-time, each of the selected variables from within the application. In the case of a value pointing to an external document or object, this allows the user to access the (selected) external documents used in the program module.

Updating child modules in the system generates the well known problem of compatibility with existing parent modules. This issue is addressed by providing the system with ways to graphically represent multiple versions of modules as explained in connection with FIG. 4.

Thus, the system includes means for storing multiple versions of said program module and means for displaying with the application icon a time axis and time icons, means for associating to at least some of the time icons a specific version of said program module and means for displaying the icon configuration according to the version associated to a time icon designated by said input device. Using time axes in accordance with this embodiment can, of course, be generalized, beyond the environments otherwise discussed herein, to more generalized settings in graphical environments where multiple versions of programs are used. Thus, this use of time axes and icons constitutes a special, independent aspect of the present invention.

PRACTICAL APPLICATION OF THE PRESENT INVENTION

The present invention provides an environment (including a system, method, and medium) which enables an end-user, who may have fairly limited programming language skills, to develop application programs. This is done by providing methods which extend the methodology of a spreadsheet system to a complete application development environment. The spreadsheet methodology is extended to a complete functional language keeping the advantages of spreadsheets for the end-user intact. Thus the invention makes use of the knowledge of a spreadsheet user, to create program applications. Further, the invention provides ways to utilize the spreadsheet extension in a patchwork mechanism which allows the developer and the end-user to share program components in an end-user friendly way. As a result, the cost of development and maintenance of new application programs will be significantly reduced because the invention utilizes to a greater extent the knowledge of the user. Moreover the invention provides cost efficiency by allowing reuse and sharing of program modules between end-users and developers with different background by combining the spreadsheet extension with other end-user friendly paradigms.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF PREFERRED EMBODIMENTS

In the following, examples of embodiments of the present invention are described.

Figure 1:
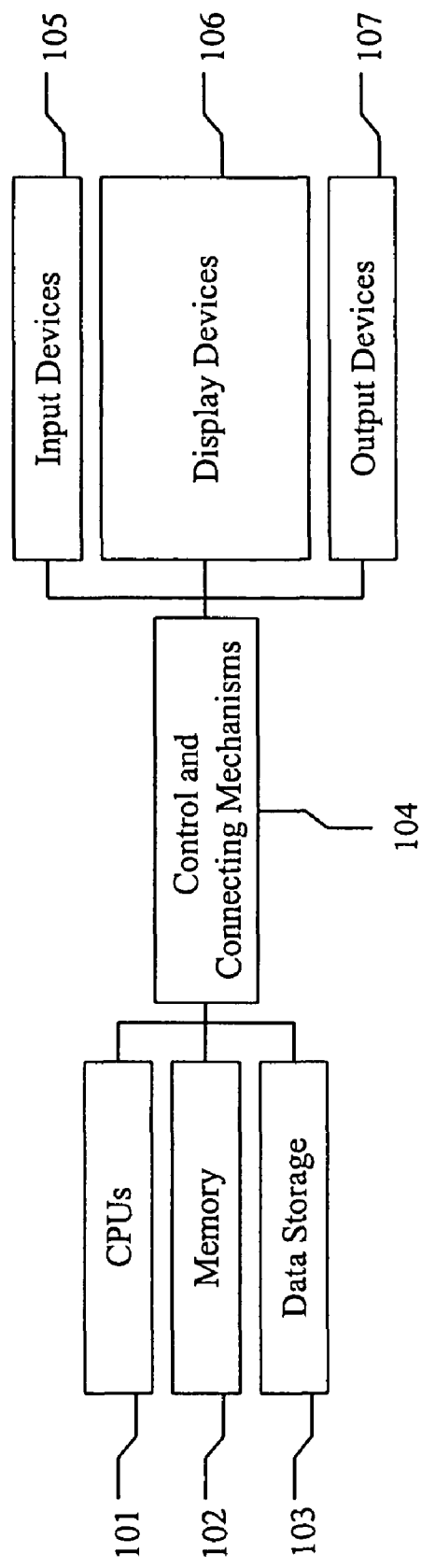
FIG. 1 is a schematic block diagram of a system arrangement for the present invention.

FIG. 1 shows a computer system (100) arrangement for performing the present invention. Numeral 101 denotes one or more CPU, 102 denotes computer memory, 103 denotes data storage such as hard disks or any other type of data storage, 105 denotes one or more input devices such as a pointing device and a keyboard, 106 denotes one or more display devices capable of displaying graphical and geometrical figures and text, 107 denotes zero or more output devices such as a printer. Numeral 104 designates one or more processors, operating systems and mechanisms connecting 101, 102, 103, 104, 105, 106 and 107 into a computer system (100). This arrangement includes, but is not limited to, computers connected together by a network.

Figure 2:
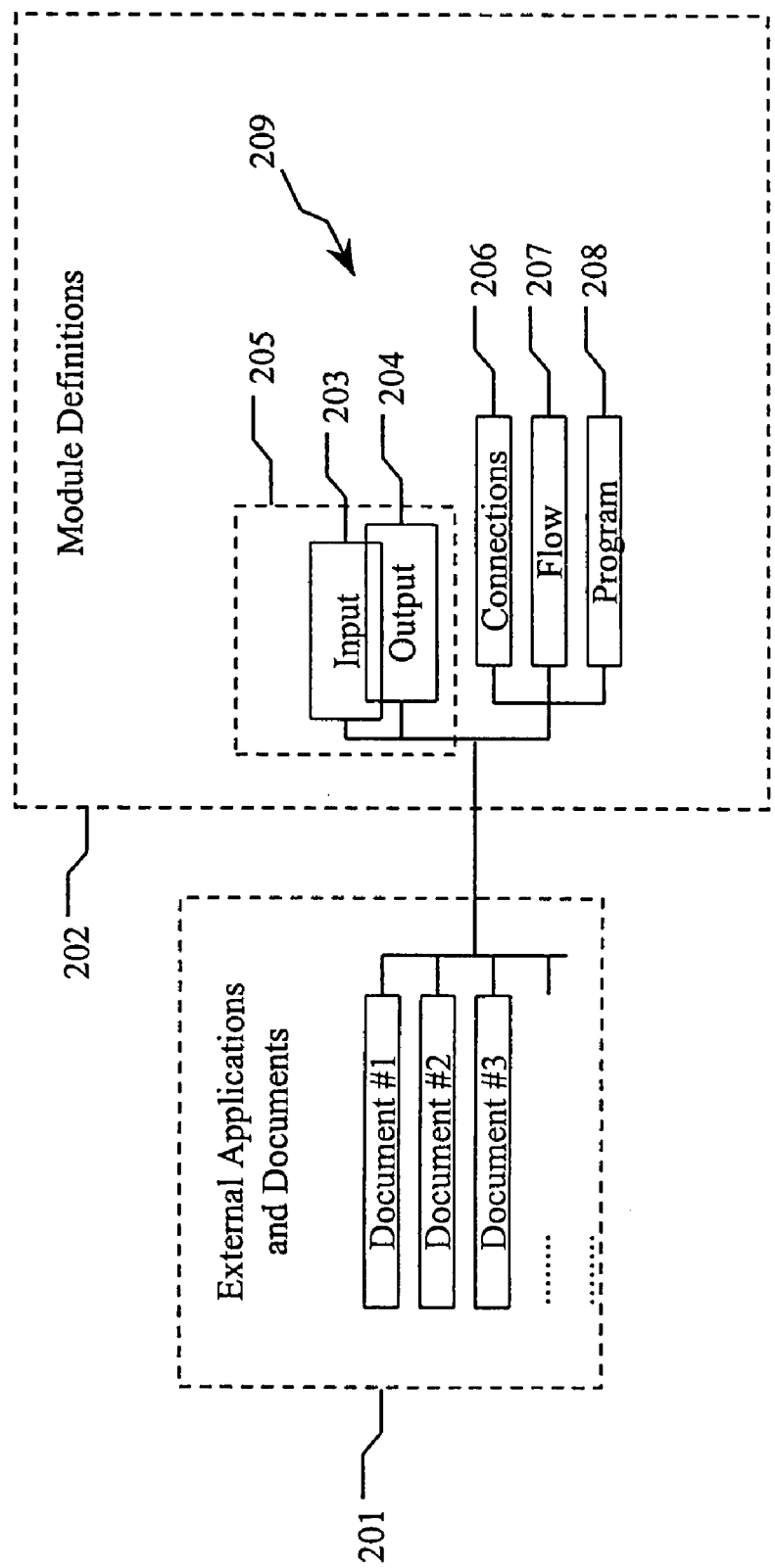
FIG. 2 is a conceptual diagram showing a program module divided into parts representing program parts defining the module; also shown are external applications used in the module definition.

FIG. 2 illustrates a generic module. A generic module (202) includes an interface part (205), connections to other modules (206), data flow specifications between modules (207) and other program statements (208). Interface part 205 is composed from input (203) and output (204) specifications. Specifications 203, 204, 206, 207 and 208 define output 204, sometimes called results, as a function of input 203. The specifications (203, 204, 206, 207 and 208) form a program specification (209) defining module 202. Statements in specification 209 can include statements referring to and using other documents or applications (201). The statements in module (202) can be created using traditional text format or other alternative formats.

Figure 3:
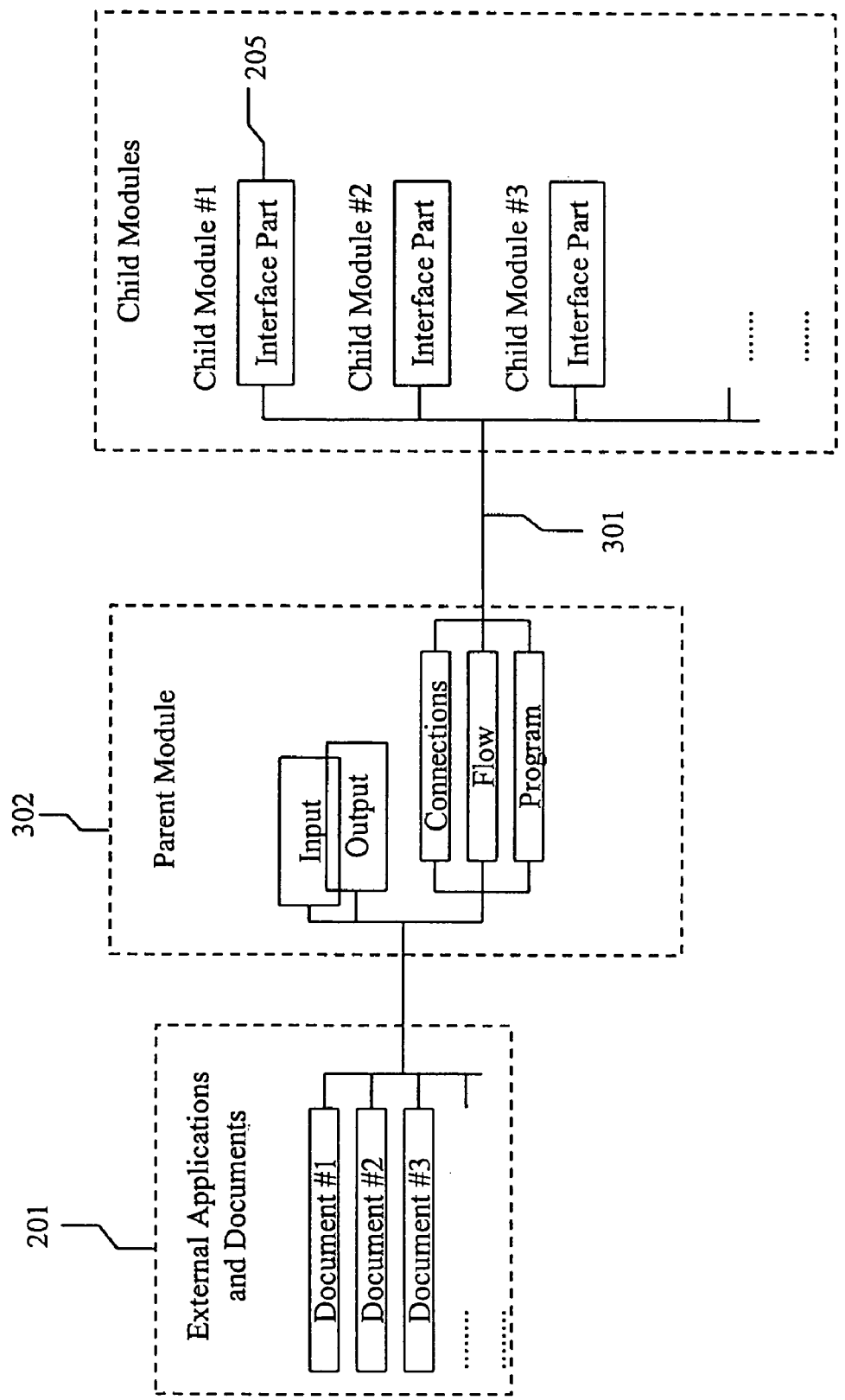
FIG. 3 is a conceptual diagram showing a relationship between a parent module and child modules.

FIG. 3 illustrates relationships (301) between modules. A module (302) of type 202, referred to as parent module, uses results from other modules, called child modules, by specifying input values or conditions for interface part 205 of child modules. Existence of relationships 301 is specified in the connections part 206, sometimes called call declarations, of module 302 and the flow of data between parent module 302 and child modules, sometimes called call definitions, is specified in flow part 207 of module 302.

Figure 4:
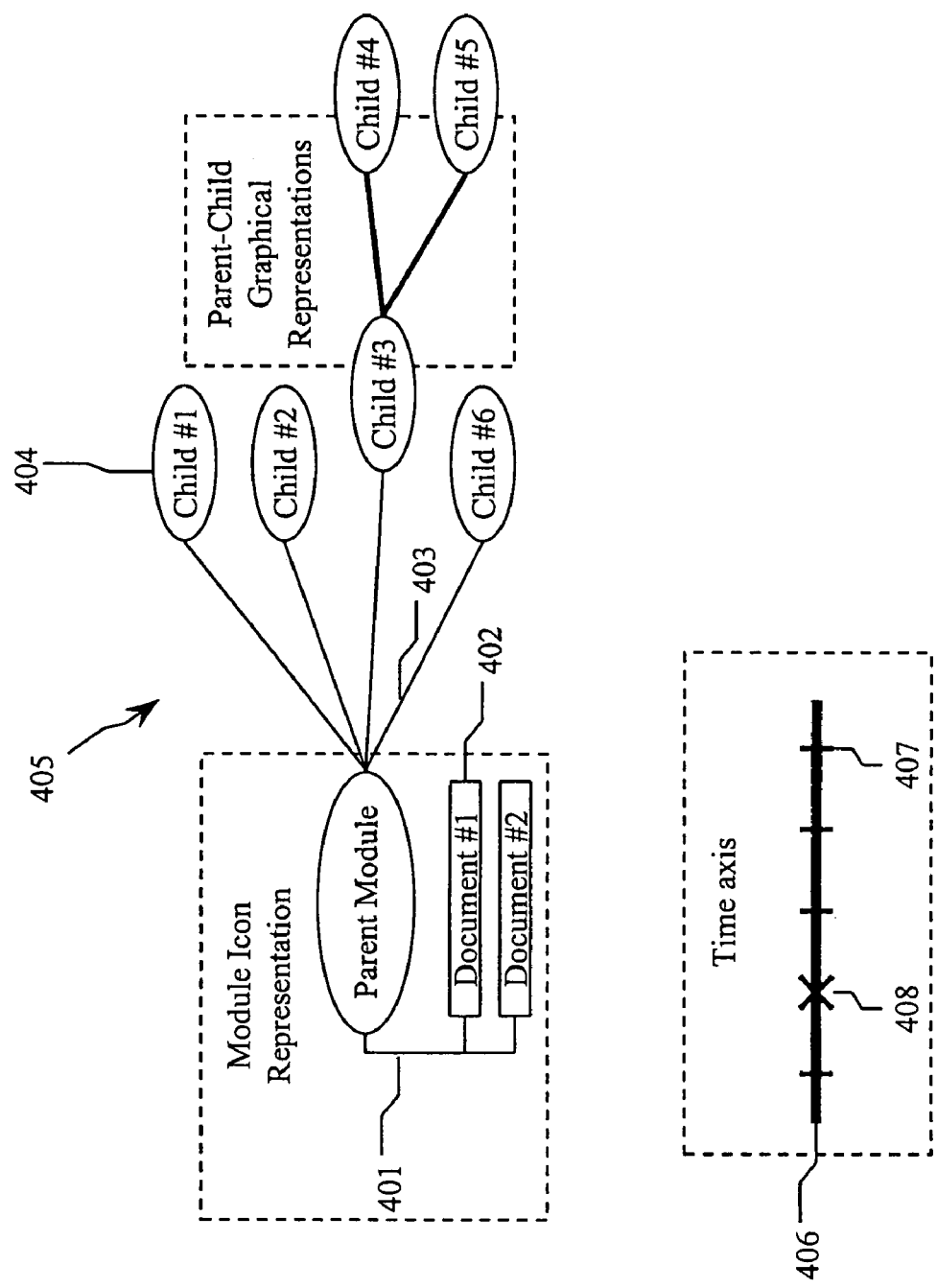
FIG. 4 shows modules and external applications represented by icons and relationships between parent and child modules represented by a modular structure diagram.

FIG. 4 shows an icon (401) representing module 302. Icon 401 is connected to other icons related to the module such as an icon (402) representing an external application variable. Each child module is assigned an icon (one of which is numbered 404) and each parent-child relationship is assigned an icon (one of which is numbered 403, usually a curve) connecting icon 401 to a child module icon. Each icon is assigned methods capable of responding to input devices 105. This defines a diagram (405) called a modular structure diagram and is displayed on a display device. Diagram 405 replaces the need for text specification for call declarations 206 for module 302, and a user is allowed to create a graphical FIG. 405 instead of writing specifications 206. To icon 401 the user has the option of associating another icon (406) referred to here as time axis. On icon 406, time axis, time icons (407) are located representing different versions of module specifications 209 for module 302. Which versions are represented by icons (e.g. 407) is determined by the user(s) creating the module specifications. Versions of specification 209 for module 302 for which a time icon is placed on time axis 406 are stored along with the current version of the specification. Modules having time axis associated with them are displayed in modular structure diagrams by their icons and with or without the time axis icon depending on whether the current version of specifications is to be used or an older version is selected. The version selected is represented by a time icon (408) having attributes or shapes distinguishing it from other time icons on the time axis.

Figure 5:
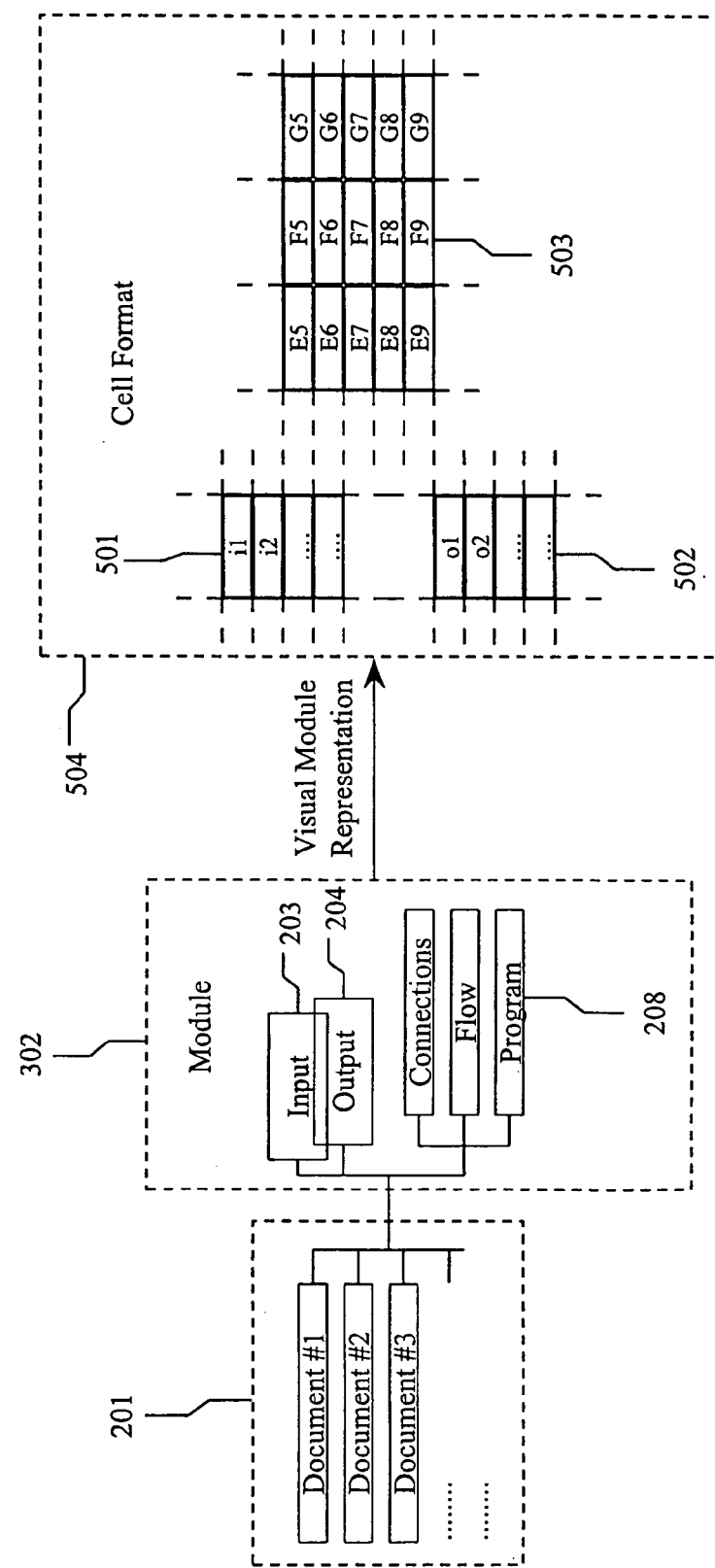
FIG. 5 explains the embedding of a program module into a cell format.

FIG. 5 shows program module 302 represented in a spreadsheet like format (504), called cell format here, composed of cells displayed on a display device. Cell format 504 contains areas designated as input variables (501) also denoted by i1, i2, . . . , output variables (502) also denoted by o1, o2, . . . and manipulation variables (503) defining respectively input 203, output 204 and program part 208 of module 302. Cell format 504 defines the input output and program part of module 302 by a functional language embedded and viewed in the cell format as described by flow chart 901 and explained below. Cell format 504 also defines a runtime environment for module 302 by allowing the user to modify definitions of cells and simultaneously view result of program operations as is standard within spreadsheet environments.

Figure 6:
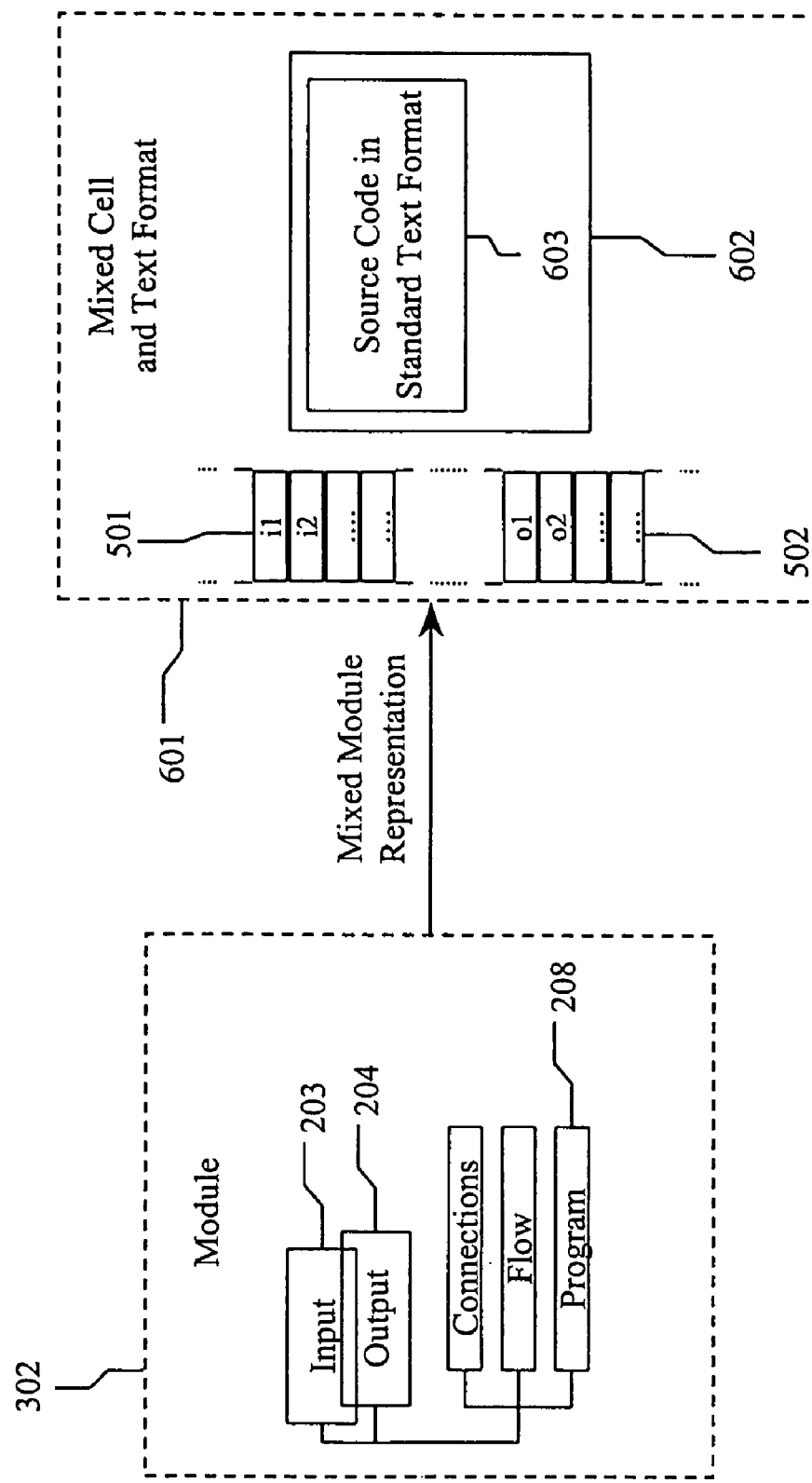
FIG. 6 explains the embedding of a program module into a mixed text and cell format.

FIG. 6 shows program module 302 viewed in a mixed cell—and text, or equivalent, format (601) composed of cells 501 and 502 representing input and output variables and program code 208 represented by a text area (602) containing a program source code (603). Source code 603 together with 501 and 502 define elements number 208, 203 and 204 of module 302 respectively. Flow charts 1001 and 1101 together with flow chart 901 provide methods for translating between text format 602 and cell format 503, if program source code 603 is written in a functional language. Format 601 allows users to view results of program operations and modify program definitions simultaneously through cells 501 and 502 as in format 504. A mixed cell—and text, or equivalent, format enables the user to choose a programming environment best suitable and enables the usage of more than one programming languages. Users select which format to work with, to define and use module 302, by means of input devices 105 by choosing from methods attached to icon 401. A full text or equivalent, format is possible and can be translated back and forth to a full cell format or mixed format assuming that the specification is done using a functional language.

Figure 7:
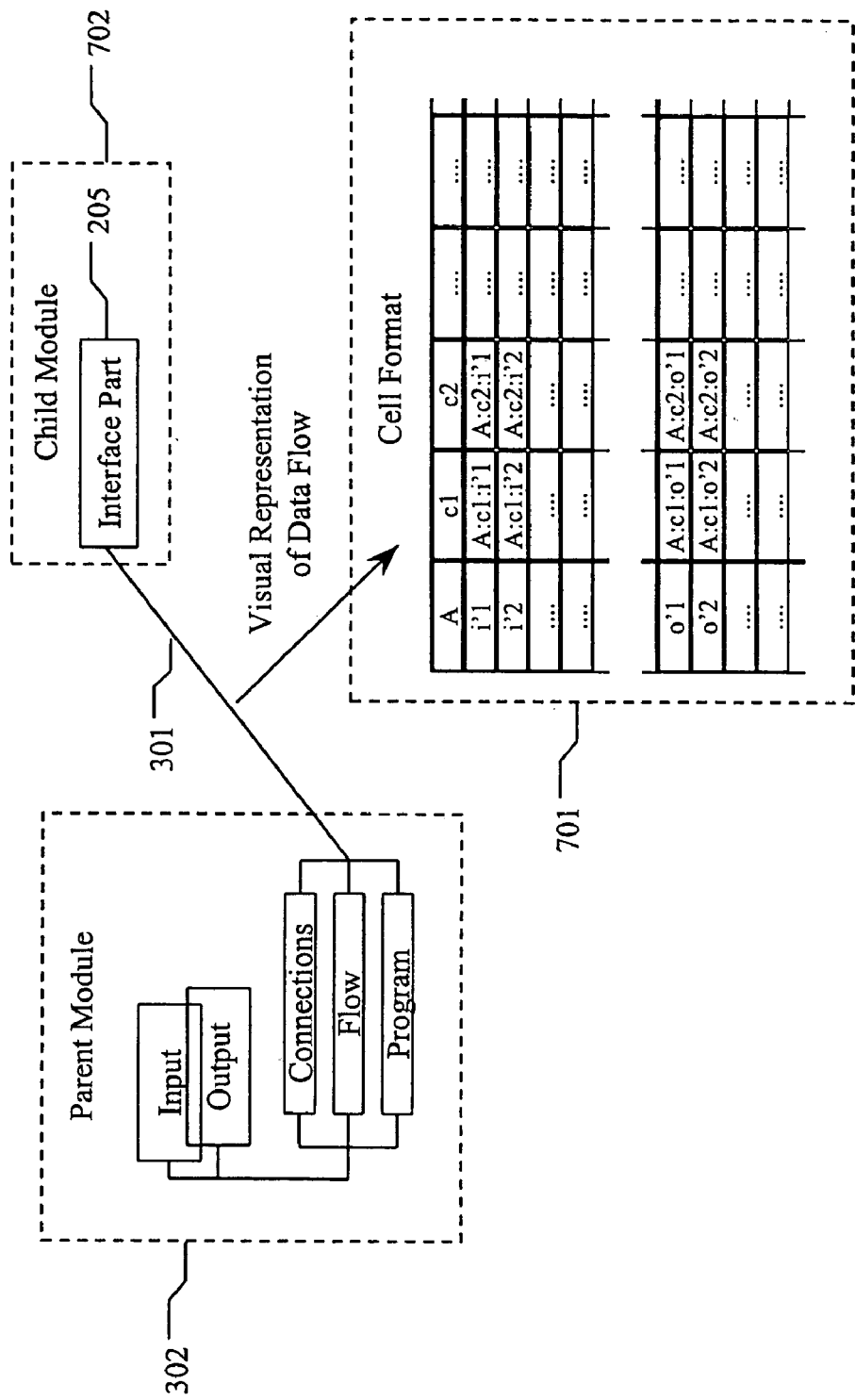
FIG. 7 explains the embedding of data flow specifications between parent and child modules into a cell format.

FIG. 7 shows the data flow specifications 301 between parent module 302 and a single child module (702). Data flow specifications 301 is represented in a spreadsheet like cell format (701) by denoting the rows in 701 by input variables 203 (denoted by i'1, i'2, ...) and output variables (denoted by o'1, o'2, ...) 204 from interface part 205 of module 702. Columns are denoted by call variables (denoted by c1, c2, ...) in such a way that each column c1, c2, ... corresponds to a call to child module 702 with input values in rows i'1, i'2, ... and results shown in rows o'1, o'2, ... if the user chooses to view results at the same time as specifying data flow 301. Values passed back and forth through relationship 301 are of a general type determined by the programming language in which program specification 209 of module 302 is specified in and the values are embedded into cell format by methods described by flow chart 901. An alias (denoted by A in 701) is assigned to the relationship between parent module 302 and child module 702. Variables (denoted by A:c1: i'1, ..., A:c2:o'2, ...) in cell format 701 are made available to specification 209 of module 302. Each parent-child relationship of module 302 is assigned a user editable flow specification similar to 701 and in this way call definition part 207 of module 302 is replaced by a spreadsheet like environment. Methods for accessing the data flow specifications between parent modules and child modules are attached to icons (e.g. 403) between the modules.

Figure 8:
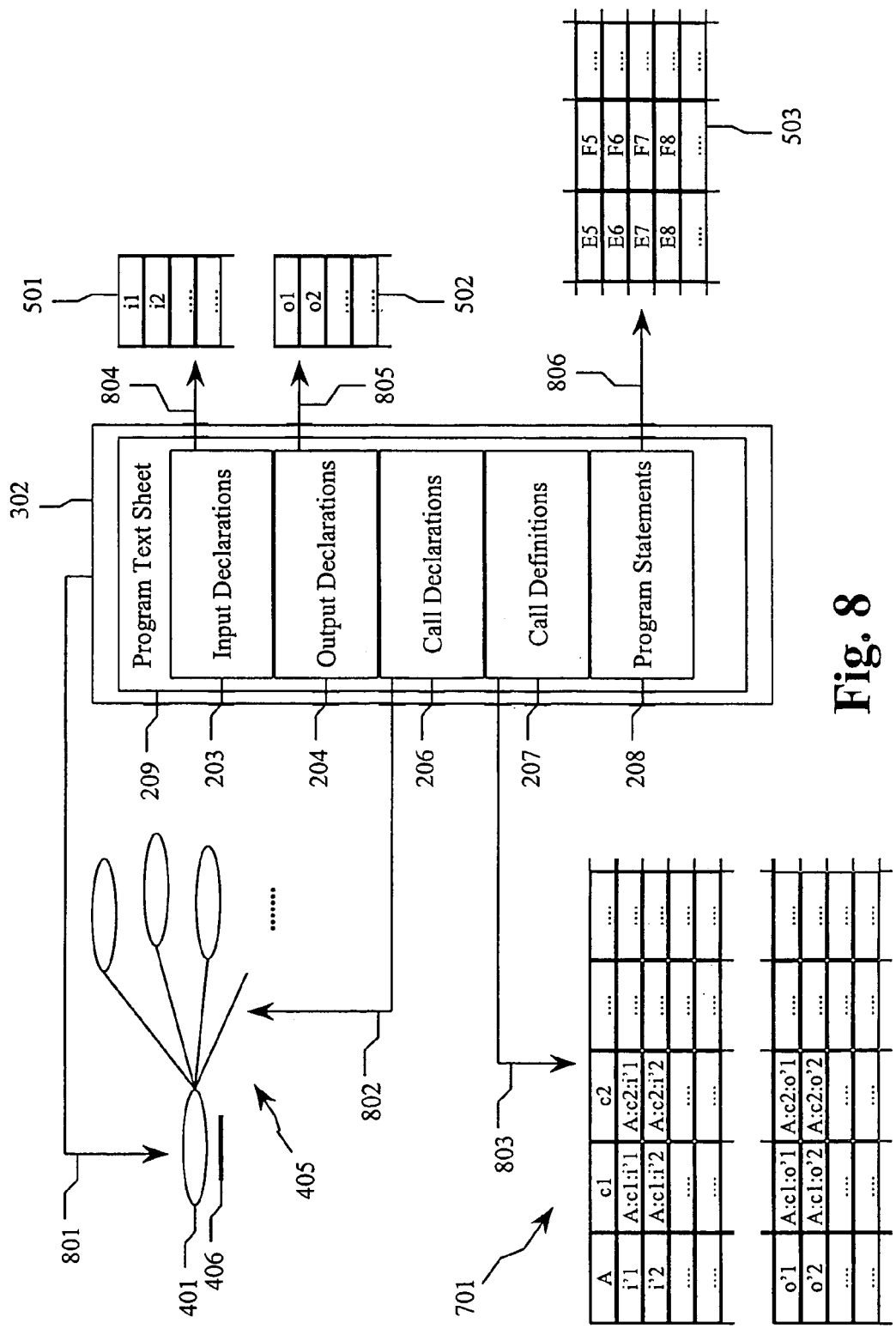
FIG. 8 is an overview diagram showing how the various parts of a program module on a text, or other, form are represented visually.

FIG. 8 provides an overview over how in the present invention each part of program specification 209 is represented graphically or in cell format replacing the need for a text specification defining 209. Module 302 is represented by icon 401 and time axis 406 to specify version as indicated by line 801 and explained in FIG. 4. Call declarations 206 for module 302 are represented by modular structure diagram 405 as indicated by 802 and explained in FIG. 4 also. Interface part 205 of module 302 is represented by cell format 501 for input declarations 203 and by cell format 502 for output declarations 204 as indicated by lines 804 and 805 respectively and explained in FIG. 5. Program statements 208 of module 302 are represented by, spreadsheet like, cell format 503, as indicated by line 806, or by text format 602 and explained in FIG. 5 and FIG. 6 respectively. Call definitions 207 of module 302 defining the data flow between modules are represented by sheets of cell format 701 one sheet for each relationship in modular structure diagram 405 as is explained in FIG. 7 and indicated by line 803. Interface part 205 of module 302 defines how other modules can access module 302 and in particular can be considered a interface into external applications 201 of module 302 or more generally a interface into a process which combines information from all modules in modular structure diagram 405 and connected external applications if present. Type definitions of variables used in input—203, output—204, call definitions 207 and program statements 208 are associated to their corresponding cells in the cell format.

In the preferred embodiment all definitions of modules, representations, users, and icons are stored in a centrally located database (in data storage 103) accessible to all users. Users share access to modules by placing icons (e.g. 401) in a folder directory structure, also stored in the database, defining access rights of other users and associating a description of the module to the icon for clarity. This enables the sharing of components between users of the system (e.g. network) having different programming skills, including users with only knowledge of spreadsheet systems, since data flow between modules can be defined using cell format (e.g. 701) and a runtime environment is defined by a cell format also (e.g. 501 and 502). In order to access a particular module, the user, using input devices 105, selects it from its folder, shown on a display device, and places it in a modular structure diagram describing a new application or activates it (e.g. runtime environment 504). In the preferred embodiment, compiling of modules is done relative to cells viewed at each moment on the display device used and all changes in underlying structures are reflected immediately. Users are warned and informed about how changes in module definitions affect other modules and have the option of using time axis to leave parent-child relationships unchanged. The usage of time axis allows existing modules to function unchanged when modules are upgraded.

Example: This example refers to FIG. 15 and FIG. 16. Here some of the features shown in FIG. 8 are explained. The following is a simple source code written in text format. The language used is classified as an "advanced functional language" by the definition used earlier. The module (Audio) searches a table (B2 or "OPERAS.DB") containing sound files and locates the sound according to a keyword (B5) in the default key for the table. The variable B3 represents the row in the table containing the sound specification (B7). The sound specification is in a column of the table with the healing "SOUND".

```
Module Audio
Input(B5 string)
Output(B7 sound)
Begin
    B2 := table("C:\SOUND"; "OPERAS.DB").
    B3 := row(B2; B5).
    B7 := item(B3; "SOUND").
End.
```

Figure 15:
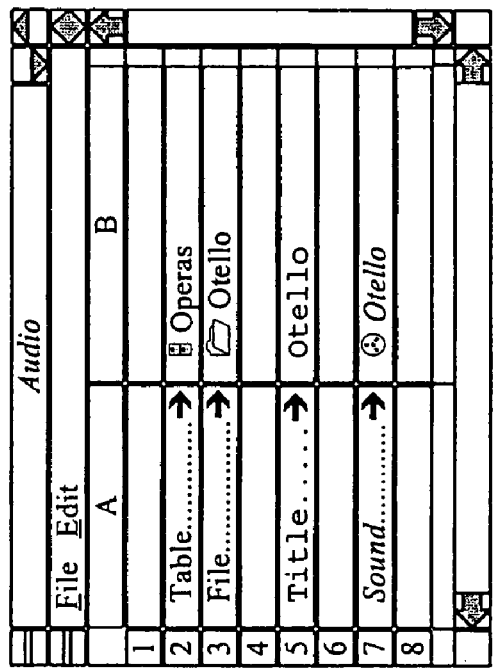
FIG. 15 and FIG. 16 are used in connection with an example presented.

When viewed in cell format the input 203, output 204 and the program statements 208 for the above source code are shown using indication values resulting from some choice (made by the user) of input values (B5 here, in the below B5 is assigned the keyword "Otello"). Evaluation of the module binds the variable B2 to a table object "OPERAS.DB" located on a storage device indexed by "C:\SOUND" in this case. The indication value for B2 is "▦Operas" which informs the user of the system that variable B2 points to a table named "Operas". The variable B2 is then referred to in other cells, e.g., the formula row (B2; B5) defines cell/variable B3, in the same way as in a normal spreadsheet application. When the user is editing a particular cell the original definition of the variable is displayed, e.g., when editing cell B2 the text table ("C:\SOUND"; "OPERAS.DB") is used. Similarly the variable B3 is assigned to a row of the table and has indication value "▱Otello"

and the resulting sound object located in the table and assigned to variable/cell B7 has indication value " Otello". An embodiment could thus represent the module using cell format 501, 502 and 503 as shown in FIG. 15.

When editing the cells B2, B3 and B7 the actual text definitions in the Source code appear as formulas defining the values shown. When editing the input cell/variable B5 the input value chosen is displayed for editing, here "Otello".

In some embodiments the, text definitions of all or some of the variables B2, B3 and B7 will be replaced by other alternative ways to define and edit the variables.

In order to access the above Audio module from another module (Enhanced Audio below) the user places the audio module as a child module in a modular diagram shown in FIG. 16.

Figure 16:
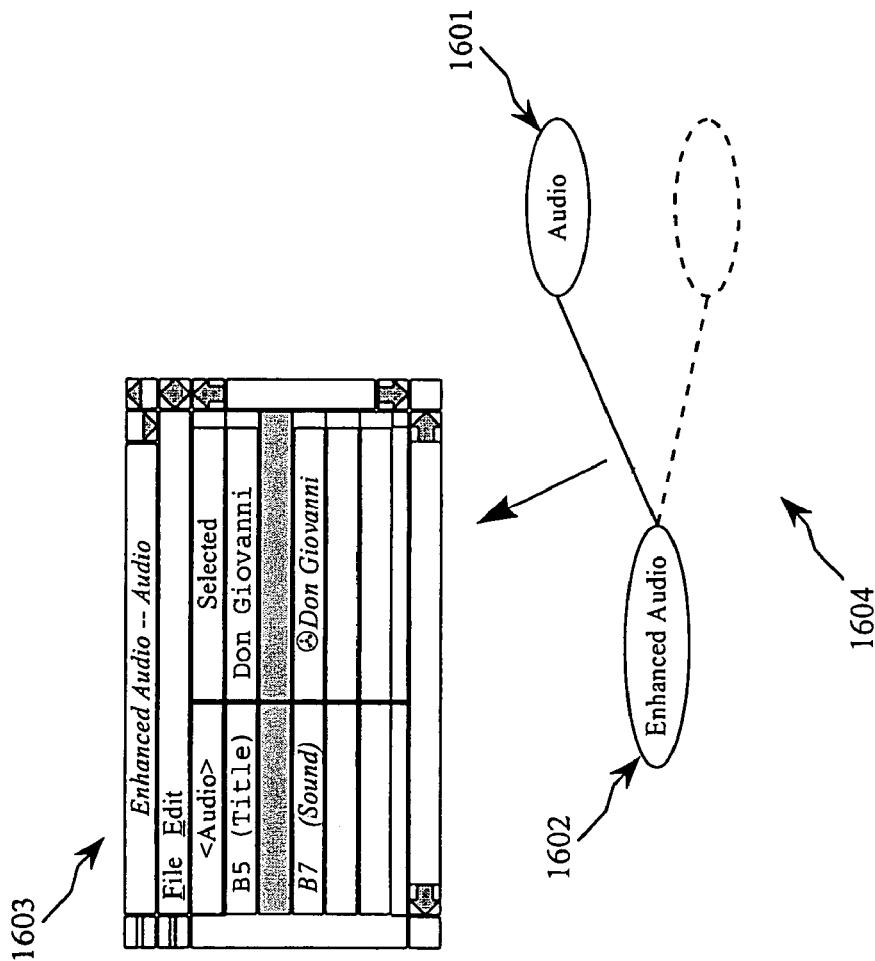

Defining the flow (call definition) between the new module and the Audio module is then done by the user using cell format 701 as shown in FIG. 16. In the above the input variable of the Audio module (named here Audio:Selected:

B5) is assigned the value "Don Giovanni" and the resulting sound object is assigned to the variable indexed (named) by "Audio:Selected:B7" and shown using indication value "☉ Don Giovanni". The variable "Audio:Selected:B7" is recognized in the module Enhanced Audio in FIG. 16 and is used to refer to the sound object resulting from the call to the Audio module.

Figure 9:
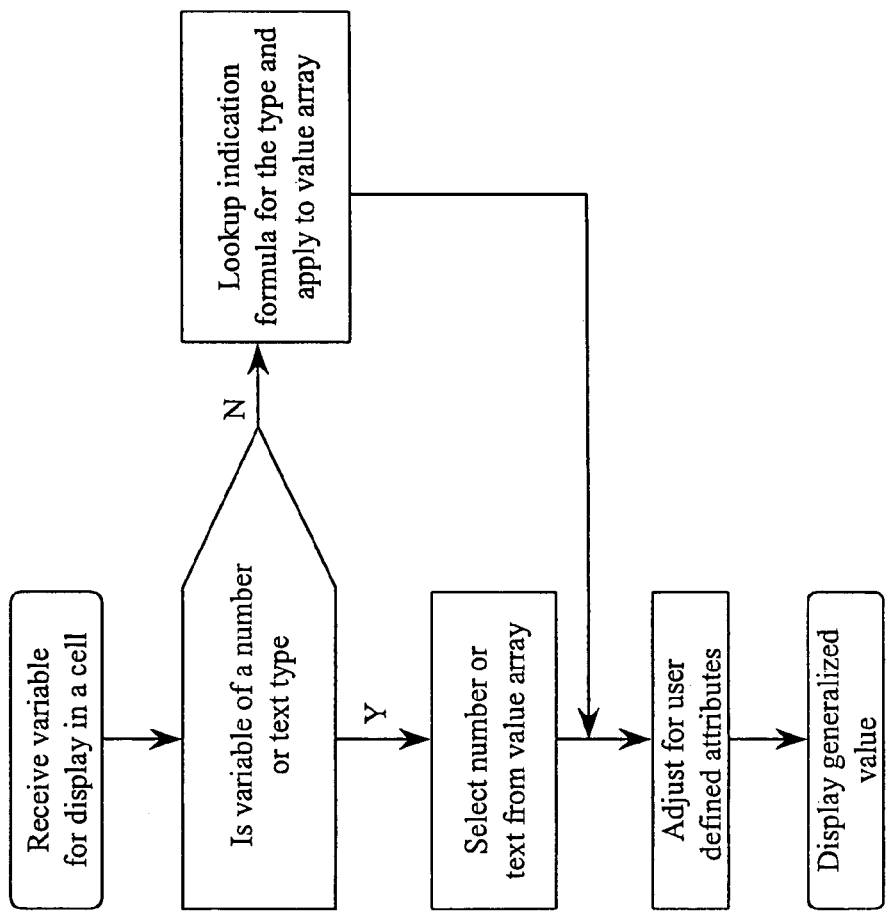
FIG. 9 is a flow chart for displaying a variable value of a statement in a functional language in a cell.

FIG. 9 shows flow chart (901) describing a method for displaying a variable value of a general type in a cell in such a way that extends the way mathematical formulas with number values and text is viewed in cells. A variable—or a cell value, can be considered an array holding information about the value as determined by the variable type and the variable definition. The value array is associated to the cell holding the variable/cell definition. Information in the variable/cell value array is entered into the array by a program execution mechanism which updates the value array to reflect changes in other related variables/cells or in the variable/cell definition itself. One type of the information in the array is the variable type. The program execution mechanism also triggers the display mechanism to change the displayed value of the cell. Values considered are of general types such as a number, formula, array, geometrical object, form, database, table or a row type as determined by the programming language. A variable of a text or number type is displayed in a cell by its formatted value. The same applies to some other types such as date and time. In preferred embodiments, values of more general types are displayed in cells by applying a function, called indication function here, to the value array which specifies a method, based on the value type, for determining the displayed cell value of the variable. The resulting displayed cell value is a combination of text and icons fitting into a cell. The icons are selected from an icon font and combined with the text to form the cell display. Attributes such as color can be applied to the cells in a standard way. An example of such a function is an indication function which assigns to a variable an icon, representing the variable type, and concatenates to the icon a keyword selected from the information about the variable in the variable array. A value resulting from applying the indication function to a variable is referred to as the indication value of the variable. The variable array is not displayed but is associated to the cell. As is standard with spreadsheets, a syntax error in the definition of a variable is indicated with an error flag in the cell. Flow chart 1201 describes a method for viewing a variable of a general type in another way namely by its full value.

Figure 10:
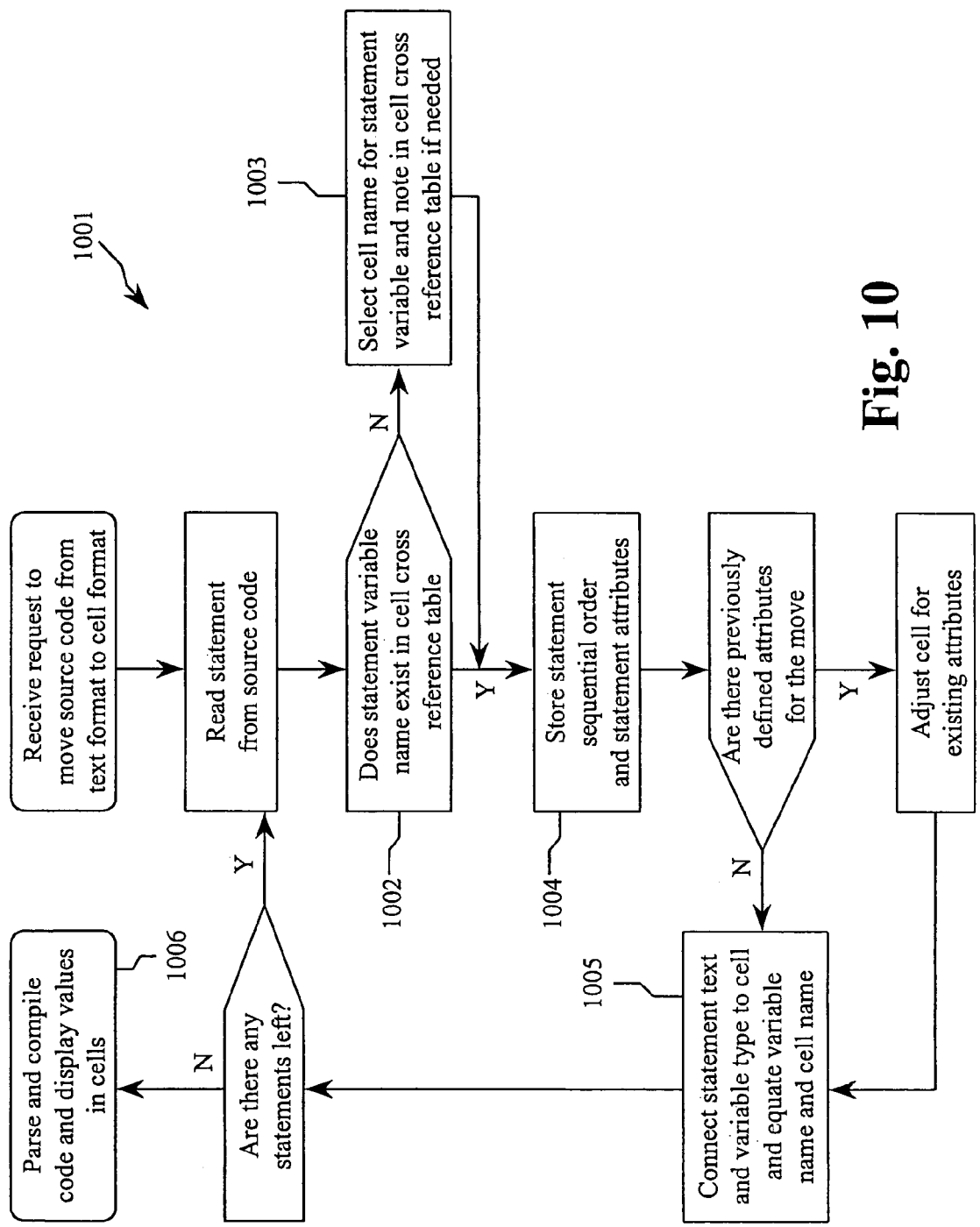
FIG. 10 is a flow chart for embedding a program source code on text, or equivalent, format into a cell format.

FIG. 10 shows a flow chart (1001) for embedding a program source code on text, or equivalent, format into a cell format assuming that the programming language used is a functional language. Each statement in a functional language is associated with a variable of some general type and it is therefore possible to associate each statement and its variable to a cell in a cell format as described below. The mechanism described by the flow chart reads the statements in the source code and determines (1002 and 1003) into which cell to put each statement. To which cell a statement belongs, can be determined by its variable name, information in a cross reference table about a previous embedding from a cell format into text format (see flow chart 1101) and adjusted during modification of the text to keep track of variables, user input and sequential mapping (that is a mapping of variables into some area containing enough cells). The mechanism shown stores separately information about the text, or other, format, not used in the cell format, such as the sequential order of the statements in the text (1004). The mechanism shown also reads information about a previous cell format for the program, if one exists, and formats the cell format accordingly.

Once a location for the statement in a cell and existing attributes have been determined by the above measures, the variable name for the statement and the cell name are equated and the variable type is registered in the type array associated to the cell (1005). Conflicts which arise from naming of statement variables are resolved by always mapping a statement; whose variable name is the name of a cell in the cell format into the corresponding cell. Variable values are then displayed in the cell format (1006) as described by flow chart 901 for each cell after a compiling and parsing mechanism has been activated to determine the variable/cell value array for each cell used. The program is then edited in the cell format in a similar way as a conventional spreadsheet. When adding or modifying statements in a cell format the variable type is determined from the syntax of the statement entered but can, when more than one types are possible, be adjusted by the user.

Figure 11:
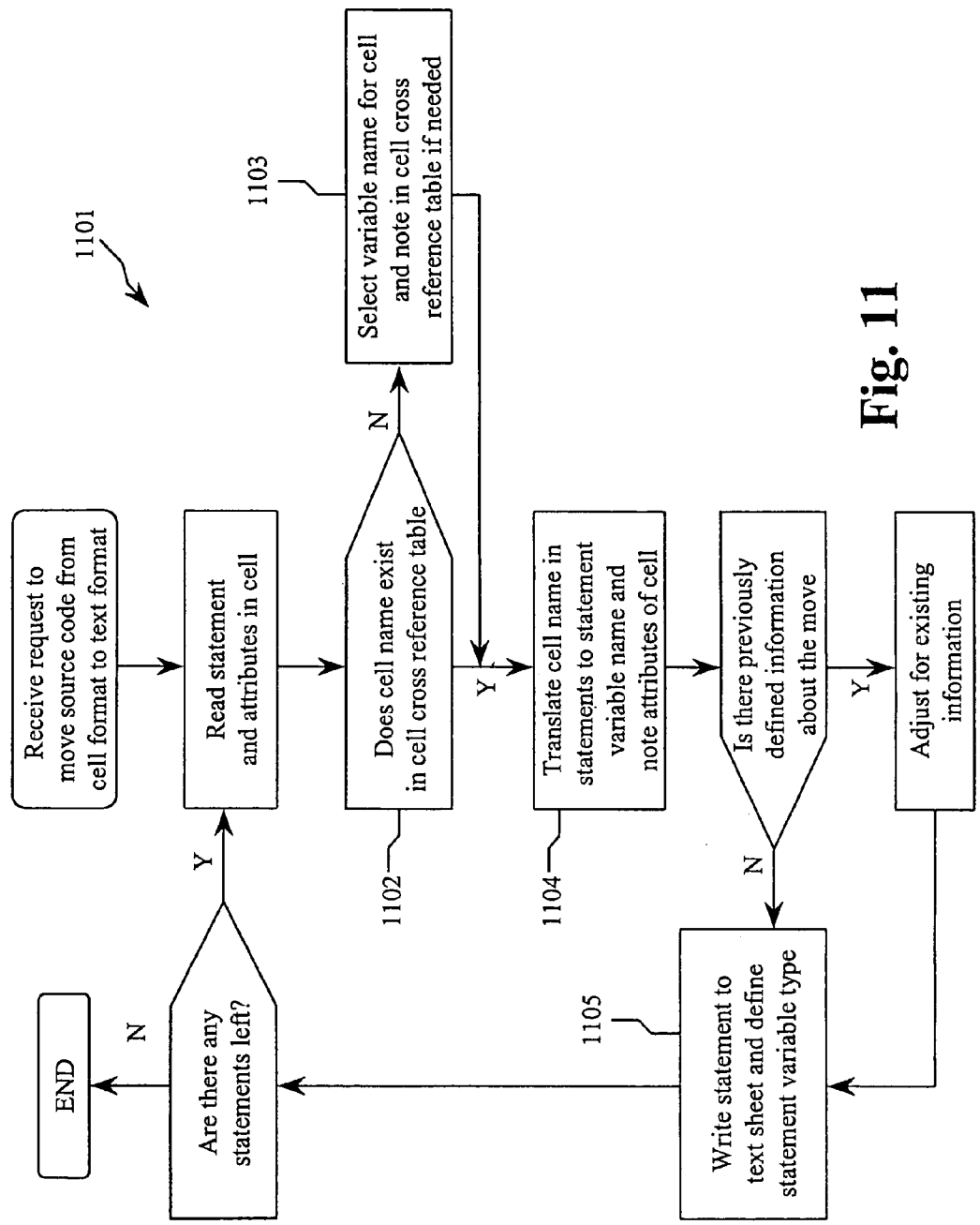
FIG. 11 is a flow chart for translating source code on cell format into text format.

FIG. 11 shows a flow chart (1101) for translating source code on cell format into text or equivalent, format. The mechanism described by the flow chart reads the statement associated to each cell and determines which variable name to use in the text format for the statement (1102 and 1103). Which variable name to use for a cell can be determined by the cell name or by a translating table (referred to in flow charts as cell cross reference table). The translating table may contain information from a previous embedding of the source code into cell format. Statements in the source code are modified to use the variable name instead of the cell name and attributes and information about the cells are stored separately (1104) to allow for an embedding back into cell format. Information from a previous embedding into cell format can be used along with other methods such as sequential ordering of statements in text and using current attributes of statements in cells to place and format statements in the text format. Statements are written into the text format (1105) and assigned to their corresponding variables. Information about the type of a variable is contained in the value array associated to the variable cell in the cell format and variables in the text format are declared accordingly using the format specified by the (functional) language used.

Figure 12:
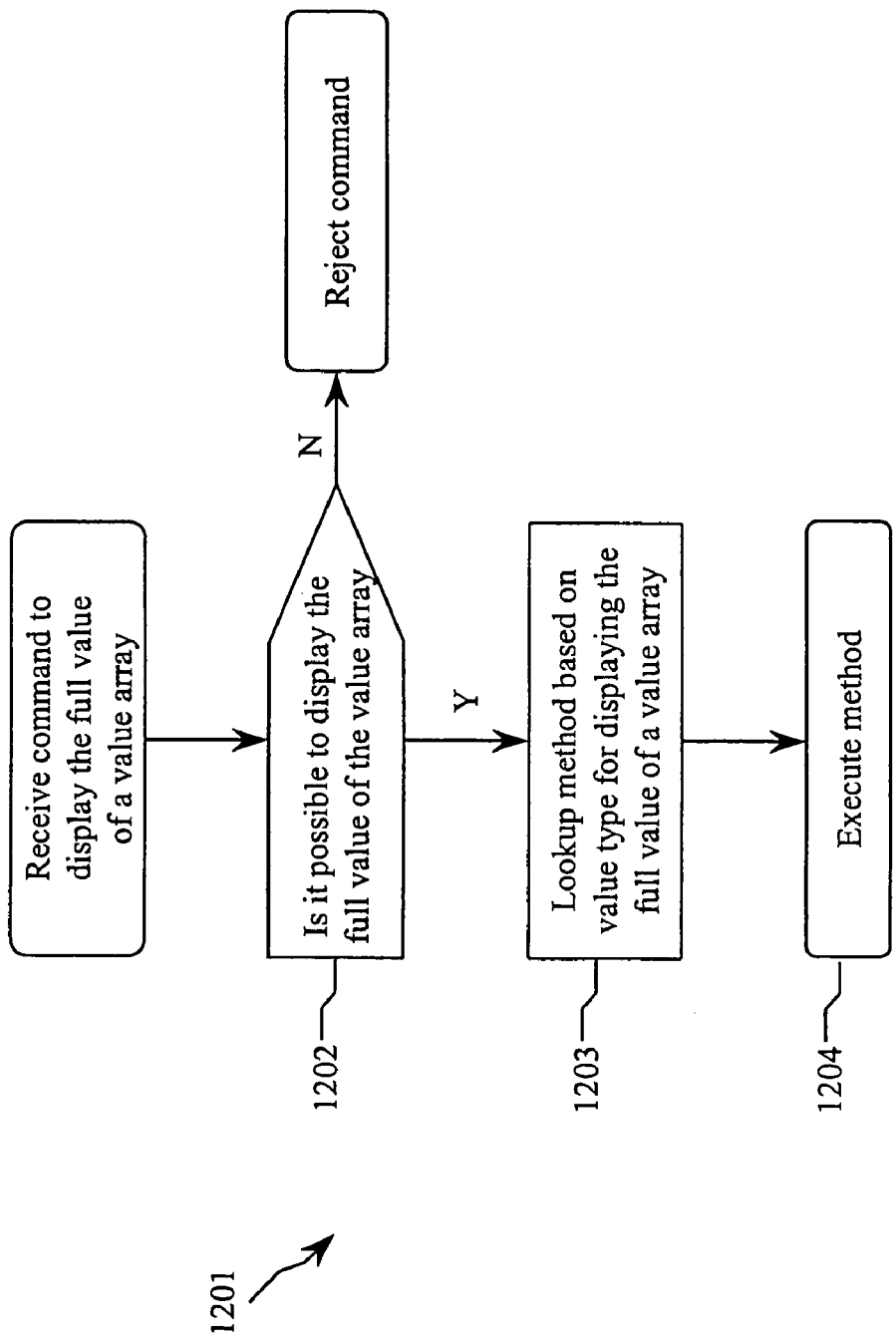
FIG. 12 is a flow chart for responding to a command to display the full value of a variable.

FIG. 12 shows a flow chart (1201) describing a mechanism for displaying the full value, by definition here, of a variable/cell value. This mechanism is triggered for a cell in a cell format by the user using an input device such as a mouse. The mechanism uses a classification of variables by types to determine methods for displaying the full value of a variable value. Information contained in the variable/cell value array associated to a cell in a cell format points to and is centered around external documents for many variable types. Example of such types are table types representing database tables in database systems, graphical—and picture types, sound types representing sound specifications, types representing word processor documents written in different formats and many other variable types. For variable types centered around external/underlying documents, the full value is displayed by activating a process resulting in the document being viewed/represented and being editable in its native application on a separated but possibly overlying area, from the cell format, of the display device or on a device determined by its native application. Methods for activating a document in its native application are well known in the field and are usually restricted by the operating system and the native application itself. For other types such as text and numbers the full value is simply showing available details, determined using the value array, in a way which is not restricted, for ex. by size, by the cell format. Accordingly, since viewing the full value is restricted by the capabilities of the operating system and other applications, not all types are necessarily displayed using full value as-indicated by (1202) in the flow chart. In the preferred embodiment, a list of methods for displaying the full value is available and searched (1203) and the corresponding method activated (1204) to display the full value of a variable/cell.

Figure 13:
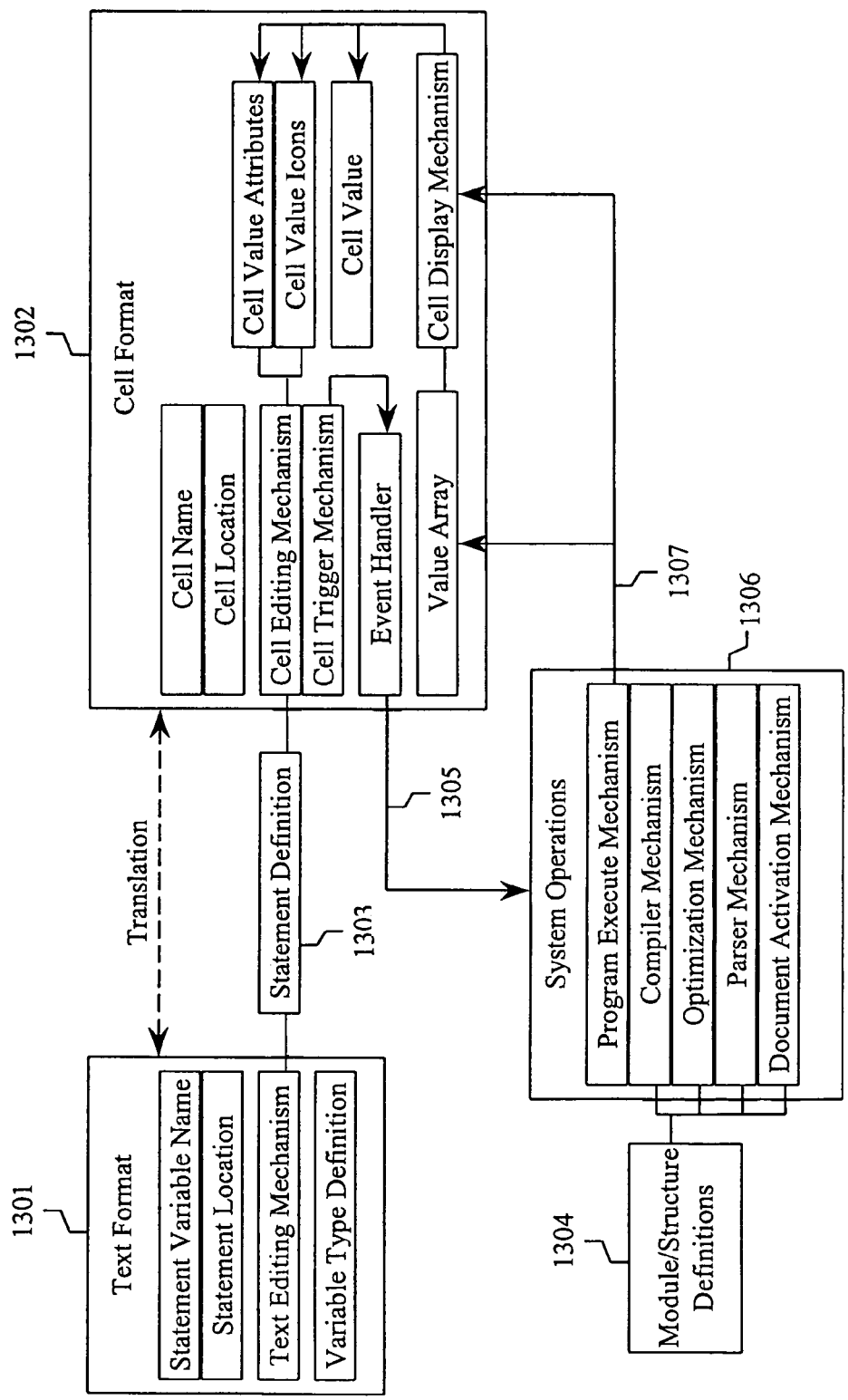
FIG. 13 is a schematic block diagram explaining multiple display formats.

FIG. 13 shows a schematic block diagram. FIG. 13 gives an overview of the duality between a text and cell format and explains the above methods further. Program statements written in text, or equivalent, format are denoted by blocks numbered 1301 and 1303. A statement written in a functional language can be considered to be an assignment y=f(x) where y is the resulting variable, x represents the statement input variables and f represents the statement as defined by the programming language. Variable y has a variable name and a type definition as shown in box 1301. The statement f(x) is represented in box 1303. Associated to text, or equivalent, format 1301 is an editing mechanism as shown. Translation mechanism described by flow charts 1001, 1101 translate between the two formats. In cell format 1302 the variable y is assigned a cell and the variable—and cell name, also representing the cell location as is standard for spreadsheet environments, are equated and thus refer to the same variable y. The statement text, or equivalent, f(x) is assigned to the cell and can thus be edited by allowing the user to select the cell for editing its contents as is standard with spreadsheet environments. A change in the cell contents results in a changed definition for the corresponding module. A cell in cell format (1302) is assigned a value array to store information including results of program execution as determined by a system (1306) capable of parsing and compiling module definitions (1304), stored in memory 102 and in storage devices 103, into an executable code. Module definitions 1304 are stored in multiple formats including graphical specifications (e.g. 405) and on cell or text format. A change in a value array triggered by system 1306 triggers a change in how the cell is displayed as explained in flow chart 901 and indicated by line 1307 in the diagram. System 1306 is responsible for displaying the full value of a value array as described by flow chart 1201 and explained above. Changes in cell display are triggered by changes in module definitions 1304 which includes changes in cells being edited as indicated by line 1305.

Figure 14:
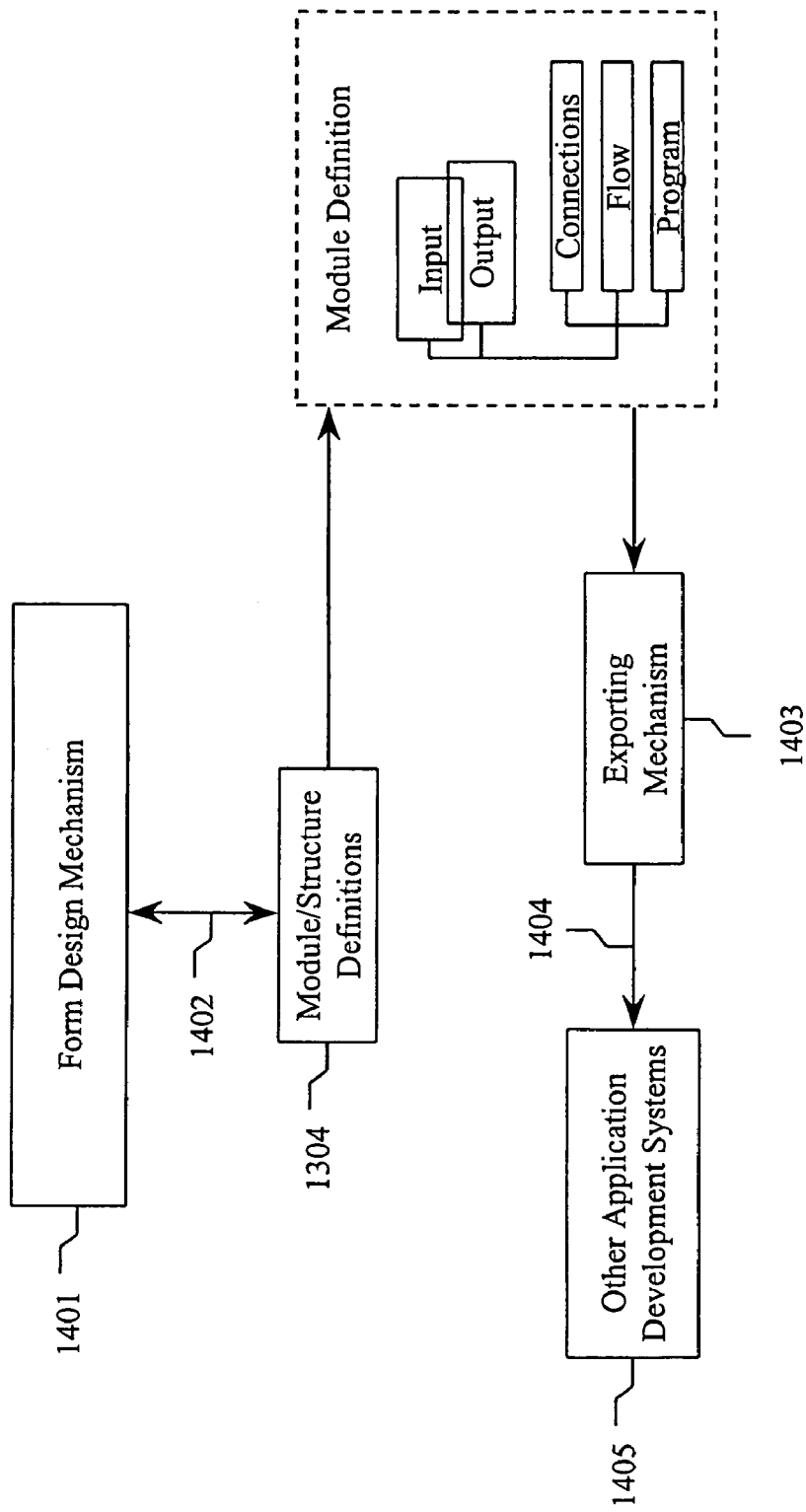
FIG. 14 is a block diagram explaining the process of exporting module definitions to other systems and using module definitions with a form designer.

FIG. 14 shows how, in a preferred embodiment, module definitions are used with traditional form designing environments and other application development systems. Forms provide an alternative format for working with modules designed by using the above methods. Module definitions are exported (1404) by an exporting mechanism (1403) into a format defined by an application environment (1405) being exported to allowing environment 1405 to access a module as a function with input values 203 and return values 204. Exporting mechanisms are well known in the art. In a preferred embodiment, a collection of methods for a predefined set of application environments and operating systems is available defining the export mechanism 1403. Exporting of modules is controlled by users of the embodiment. In a preferred embodiment, a form design and implementation mechanism (1401) is available to users allowing users to create alternative display formats in accordance with the design guidelines specified by a predefined list of operating environments. Design mechanism 1401 is capable of accessing and using (1402) module definitions 1304 directly without using an export mechanism by considering modules as functions with input—and return values.

The invention being thus described, it will become obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of representing program variables, in a cell frame displayed on a display device, specified by an advanced functional language, the advanced functional language being defined as a programming language capable of handling and returning variables of advanced types in addition to text and numeric derived variable types and in which each of the program variables can be evaluated, based on its dependent input variables, to a uniquely defined value, the method comprising:
   (a) communicating with the display device connected to a process device,
   (b) accessing the cell frame containing multiple cells displayed on said display device,
   (c) displaying text or numbers or icons or other symbols in said cell frame,
   (d) locating and accessing at least one external software component on a network or from one or more central locations and executing each said software component and representing each resulting object as one of said program variables of a more advanced type than the numeric derived or text types,
   (e) associating said program variables with the multiple cells in said cell frame,
   (f) accessing said program variables, and
   (g) displaying in the multiple cells, associated with said program variables, indication values, containing text and/or icons or other symbols as determined by an indication value function applied to each of said program variables,
   thereby facilitating a platform for testing, using and extending said external software components in a spreadsheet like environment.

2. The method of claim 1, further comprising displaying a full value of at least some of said program variables.

3. The method of claim 2, further comprising editing values of at least some of said program variables by editing the full value of the variables.

4. The method of claim 1, further comprising communicating with an input device connected to said process device for editing of said program variables within said cell frame.

5. A system for representing program variables in a cell frame displayed on a display device, specified by an advanced functional language, the advanced functional language being defined as a programming language capable of handling and returning variables of advanced types in addition to text and numeric derived variable types and in which each of the program variables can be evaluated, based on its dependent input variables, to a uniquely defined value, the system comprising:
   (a) means for communicating with the display device connected to a process device,
   (b) means for accessing the cell frame containing multiple cells displayed on said display device,
   (c) means for displaying text or numbers or icons or other symbols in said cell frame,
   (d) means for locating and accessing at least one external software component on a network or from one or more central locations and executing each said software component and representing each resulting object as one of said program variables of a more advanced type than the numeric derived or text types, (e) means for associating said program variables with the multiple cells in said cell frame, (f) means for accessing said program variables, and (g) means for displaying in the multiple cells, associated with said program variables, indication values, containing text and/or icons or other symbols as determined by an indication value function applied to each of said program variables, thereby facilitating a platform for testing, using and extending the external components in a spreadsheet like environment.

6. The system of claim 5, further including means for displaying a full value of at least some of said program variables.

7. The system of claim 6, further including means for editing values of at least some of said program variables by editing the full value of the variables.

8. The system of claim 5, further including means for communicating with an input device connected to said process device for editing of said program variables within said cell frame.

* * * * *